United States Patent [19]
Brug et al.

[11] Patent Number: 5,388,014
[45] Date of Patent: Feb. 7, 1995

[54] APPARATUS AND METHOD OF SENSING THE POSITION OF A MAGNETIC HEAD

[75] Inventors: James A. Brug, Menlo Park; Richard H. Henze, San Carlos; Steven L. Naberhuis, Fremont, all of Calif.

[73] Assignee: Hewlett-Packard Company, Palo Alto, Calif.

[21] Appl. No.: 119,468

[22] Filed: Sep. 10, 1993

[51] Int. Cl.⁶ .................... G11B 5/03; G11B 5/516; G11B 5/127; G11R 5/33
[52] U.S. Cl. ................... 360/66; 324/207.21; 360/77.06; 360/113
[58] Field of Search ...................... 360/55, 77.11, 113, 360/77.06, 77.12, 77.13, 66, 63; 324/207.21, 252

[56] References Cited

U.S. PATENT DOCUMENTS

| | | | |
|---|---|---|---|
| 3,860,965 | 1/1975 | Voegeli | 360/113 |
| 3,918,091 | 11/1975 | Walraven et al. | 360/77.06 |
| 4,012,781 | 3/1977 | Lin | 360/113 |
| 4,179,720 | 12/1979 | Miura | 360/77.06 X |
| 4,626,946 | 12/1986 | Vinal | 360/113 |
| 4,677,377 | 6/1987 | Takahashi et al. | 324/207.21 X |
| 5,027,243 | 6/1991 | Gill et al. | 360/113 |
| 5,079,663 | 1/1992 | Ju et al. | 360/113 |
| 5,270,892 | 12/1993 | Naberhuis | 360/113 |

Primary Examiner—Donald Hajec
Assistant Examiner—Patrick Wamsley

[57] ABSTRACT

An apparatus and method for determining the position of a magnetic head from a magnetic track in a storage medium. The magnetic head includes two magneto-resistive elements electrically separated by an insulative layer; current leads for biasing the MR elements and rotating the magnetization of the MR elements in opposite directions that are transverse from the respective axes of the elements; and circuitry to monitor the resistance changes of the respective MR elements and producing respective first and second output signals and to manipulate the output signals to provide an indication of the cross-track position of the magnetic head relative to the magnetic track.

15 Claims, 6 Drawing Sheets

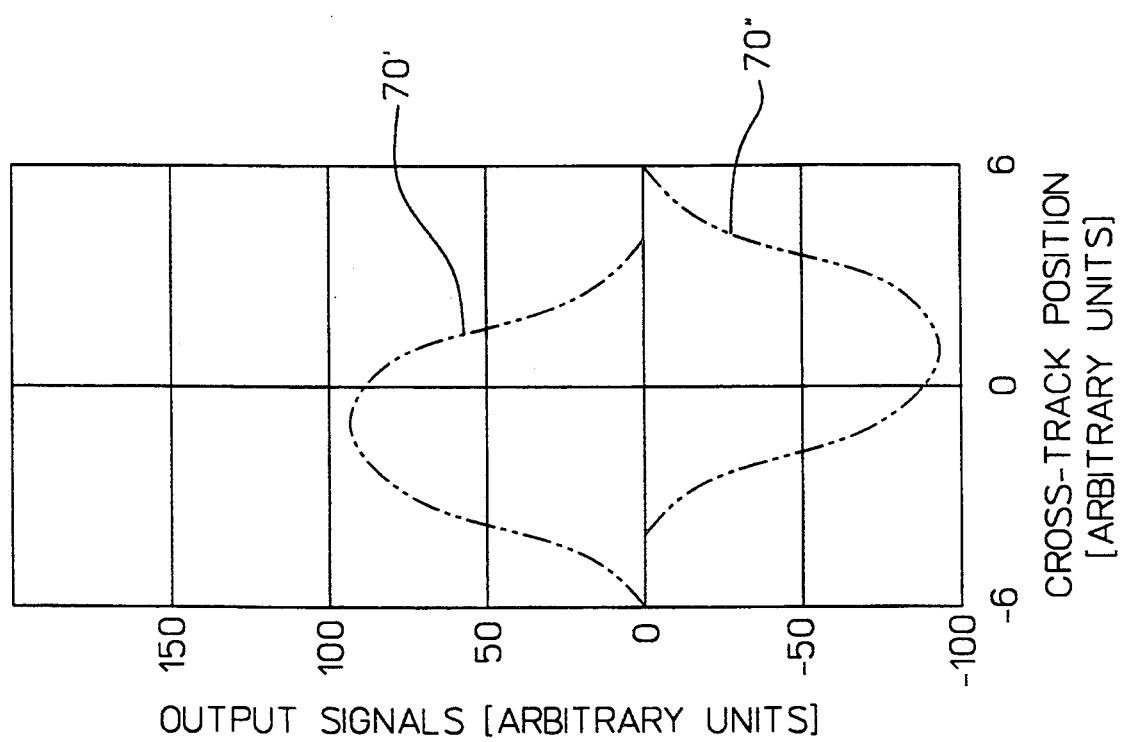

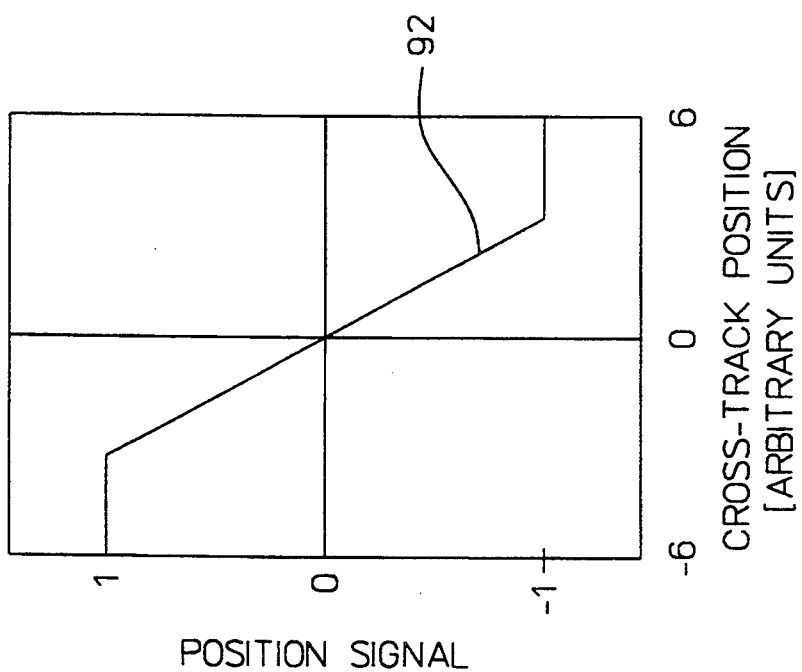

APPARATUS AND METHOD OF SENSING THE POSITION OF A MAGNETIC HEAD

BACKGROUND OF THE INVENTION

The present invention relates generally to magnetic recording, and more particularly to apparatus and methods of obtaining the position of a magneto-resistive head relative to a magnetic track. Due to the advancement and proliferation of technology, there is a constant need to store more information in a storage medium. A common form of the storage medium uses magnetic transitions on defined tracks of a surface of the medium. The transitions are written and read back by a magnetic head. In order to have more information on the tracks, there is a constant push to increase the track density by scaling down the width of the tracks. However, the higher the track density, the more difficult it is to accurately position the magnetic head over a track. During both the writing and reading process, the position of the head must be controlled to guarantee adequate signal quality for the required data integrity in a practical product environment.

The position information in the form of magnetically encoded marks have been traditionally written on the medium to carefully control the position of the head with respect to the track. Signals from these marks are read by the head and manipulated to provide position measurements. These position measurements are then used by a position controller to more accurately position the head with respect to the track.

Two methods are commonly used to encode the position information. They are the dedicated-servo method and the embedded-servo method. The dedicated-servo method is typically used for a disk drive with many surfaces to store information. One surface, known as the servo surface, is dedicated to position information only, while the remaining surfaces, known as the data surfaces, contain primarily user data. Each surface has a magnetic head to read and write data onto the surface, and all the heads are mechanically tied together. While one head, the servo head, follows the position data from the servo surface, the remaining heads, the data heads, are slaved to the servo head. As track densities continue to increase, a relative shift in position between either the servo head and the data heads, or the servo surface and the data surfaces may create unacceptable amount of position variations. These variations may be reduced by known alignment schemes. But even with such schemes, it is generally believed that the dedicated-servo method may not be extendable to storage media with high track densities.

In the embedded-servo method typically used in disk and some tape storage products, position information is encoded on every track, and is interspersed with user data. This scheme allows each magnetic head to follow every track on its own surface by reading position information directly from this surface. However, the position information tends to consume track space, which could otherwise be used for user data.

In search of alternative schemes to enable simultaneous reading of user data and relative head position, researchers have come up with different methods. One method center-taps a magneto-resistive (MR) head to split the MR head. This essentially results in two elements, oriented side-by-side. A difference signal from these two elements provides position information of the head relative to the track while the sum of these same signals simultaneously provides the desired data information. Due to lithographic resolution and tolerance limits, it is quite difficult to reduce the width of the center tap for high density tracks. As the width of the track reduces in dimension, the ratio of the center tap width to the head width becomes larger. This leads to a significant portion of the head width being consumed by the center tap, and a reduction in the data signal quality.

Another prior art method uses two electrically isolated MR elements to provide position information and user data information simultaneously. In this case, the two elements are again aligned side-by-side. But, this time, the alignment is done mechanically via lithography, with the two elements right adjacent to each other. As the width of the track decreases to increase the track density, such careful alignment becomes harder and harder to achieve.

It is apparent from the foregoing that there is a need for a magnetic head that is applicable to storage media with high track density, and does not unreasonably consume track space on the surfaces of the storage media otherwise available for storing user data.

SUMMARY OF THE INVENTION

The present invention is on a MR head that is applicable to storage media with high track density. Prior art methods include center-tapping a MR head to split it into two elements or carefully aligning two MR elements so that they are side-by-side to generate position information. As MR heads become smaller and smaller to achieve high track density, the center-tapping method degrades the signal to noise ratio, and the aligning method becomes harder to accomplish. The present invention increases the ease of manufacturability by putting one MR element on top of another to form a MR head. Moreover, with two MR elements reading substantially the same cross-track position, the signal from the MR head doubles. Prior art methods waste a lot of space in the storage media with position information. The present invention uses the user data to locate the position of the head relative to the tracks. Thus, the relative position of the head with respect to a magnetic track is known, while the user data on the magnetic track are read. Another advantage of the present invention is that the magnitude of the signal indicating the cross-track distance is substantially directly proportional to the cross-track distance. This is important in reducing the amount of calculation required for a controller to position the head.

One embodiment of the present invention has an arrangement for providing a position signal that indicates the cross-track position of a magnetic head relative to a selected magnetic track. The arrangement includes a first and a second MR elements in the head, the first element being insulated from the second, and each element having a longitudinal direction. Both elements sense substantially the same cross-track portion of the magnetic track. It is believed that the asymmetry of the signals detected by both elements in the cross-track direction forms one of the basic principles to generate the position signal of the present invention.

The arrangement also includes a current mechanism and a position decoding mechanism. The current mechanism applies a biasing current for and produces an output signal from each MR element. The two biasing currents rotate the magnetization of the MR elements in opposing directions that is transverse from the respective longitudinal directions of the MR elements.

The position decoding mechanism manipulates the output signals to establish the position signal. One position decoding mechanism generates the sum, the difference and the quotient of the sum and the difference of the output signals, for the position signal.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 4 illustrates the output signals as a function of the relative cross-track positions of the MR elements in the present invention; and FIGS. 5A–B illustrate the position signals as a function of the relative cross-track position of the MR elements in the present invention.

Same numerals in FIGS. 1 to 5 are assigned to similar elements in all the figures. Embodiments of the invention are discussed below with reference to FIGS. 1 to 5. However, those skilled in the art will readily appreciate that the detailed description given herein with respect to these figures is for explanatory purposes as the invention extends beyond these limited embodiments.

DETAILED DESCRIPTION OF THE PREFERRED EMBODIMENT

The present invention is applicable to magnetic storage media in the form of disks, tapes or other structures. For magnetic storage media in the form of disks, their magnetic tracks may be concentric in structure or may be in a continuous spiral arrangement. For storage media in the form of tapes, several track arrangements are possible, including tracks parallel to the longitudinal edge of the tape, tracks that are at an angle to the tape edge, and tracks which form an arc across the tape width. The present specification describes the invention as it pertains to disk media with concentric tracks, although it should be obvious to those with ordinary skill in the art that the invention could also be implemented in other disk, tape or other track structures.

Figure 1:
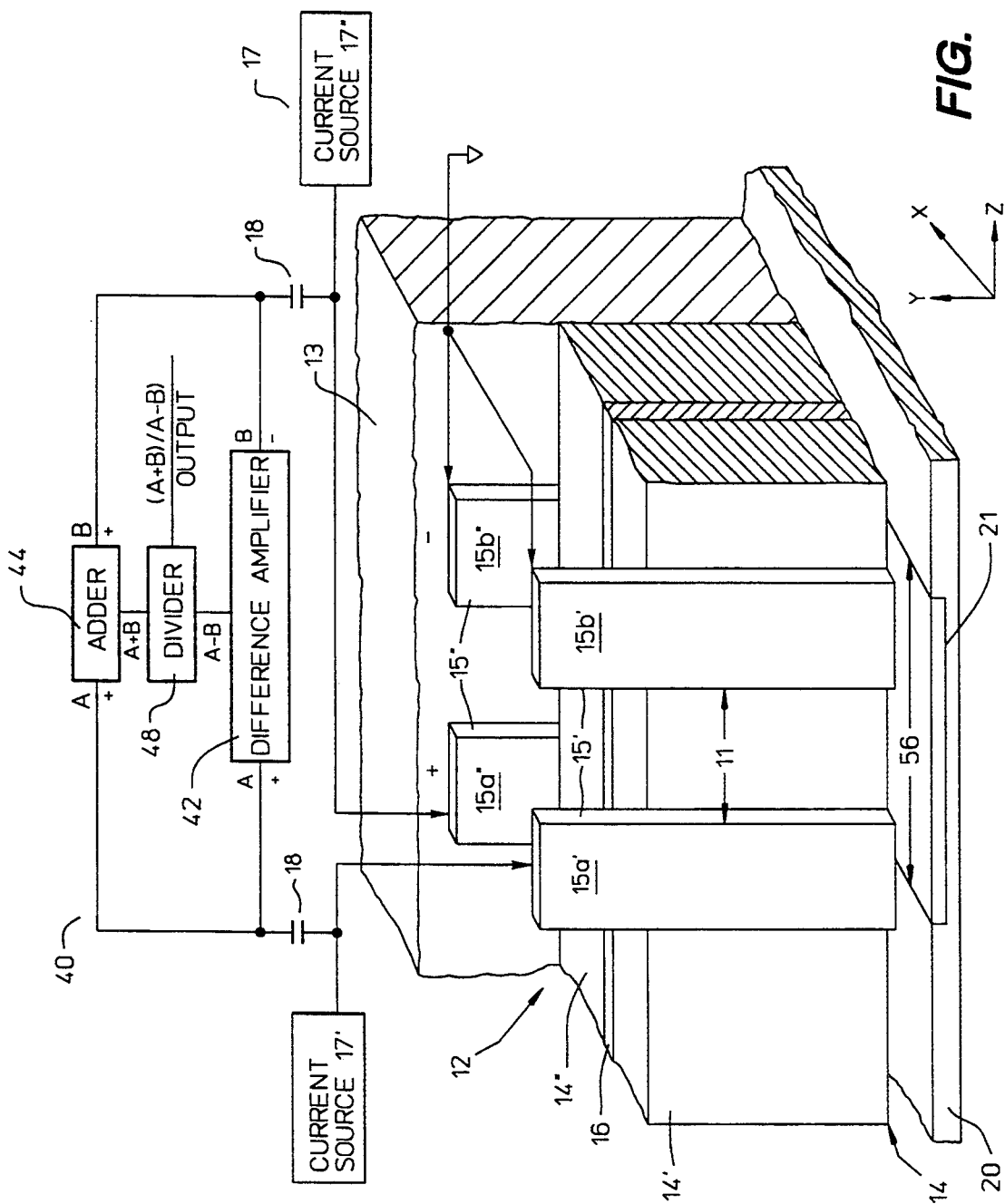
FIG. 1 shows a part of a preferred embodiment of the present invention with two MR elements, a current mechanism and a position decoding mechanism.

FIG. 1 shows a part of a preferred embodiment of a magnetic head 12 according to the invention. The magnetic head 12 is shown mounted on a broken-away portion of a slider 13, which is preferably mounted on a suspension assembly of the actuator arm of a disk drive. Construction of the magnetic head 12 on slider 13 to an actuator arm is obvious to those with ordinary skill in the art, and will not be further discussed in this specification.

The cross-track positions of the magnetic head are those across the track in the z-direction while the head is progressing in the x-direction over the track 21 in a magnetic medium 20. This cross-track motion induces resistance changes in the magnetic head 12, which is used to align the head 12 relative to the track 21. The head may contain write elements as well, but these are not shown in the drawing.

The magnetic head 12 in FIG. 1 includes a first and second MR elements 14 and signal leads 15. The signal leads 15 are for both electric current biasing of and detecting output signals from their respective MR elements 14. The first and the second MR elements 14 are, for convenience, respectively designated MR elements 14' and 14". Signal leads 15 are in turn variously designated as leads 15' and 15" respectively cooperative with MR elements 14' and 14"; or individually as leads 15a', 15a", 15b', and 15b", for separate identification.

In one embodiment, the MR elements 14 are fabricated in physical separation to ensure electrical isolation between the two MR elements 14 by an electrically insulative layer 16. The magnetic head 12 reads prerecorded magnetic information from a pre-established track 21 on a magnetic medium 20 on or over which the magnetic head 12 travels. Track 21 has a predetermined width, 56, which corresponds generally to the width, 11, between leads 15a' and 15b', or that between leads 15a" and 15b". In general, the magnetic head 12 may be fabricated conventionally according to well-known thin film techniques as for example suggested in U.S. Pat. No. 5,079,663. The magnetic head 12 is contemplated for application in reading information from magnetic media.

In the above example, both MR elements sense substantially the same cross-track portion of the track 21. In another embodiment, the two MR elements can be of different dimensions and in different location so that they sense different cross-track portions of the track 21. When the two MR elements are reading different portions, they still have a certain degree of overlap in the cross-track direction in reading the same recorded information.

Figure 2:
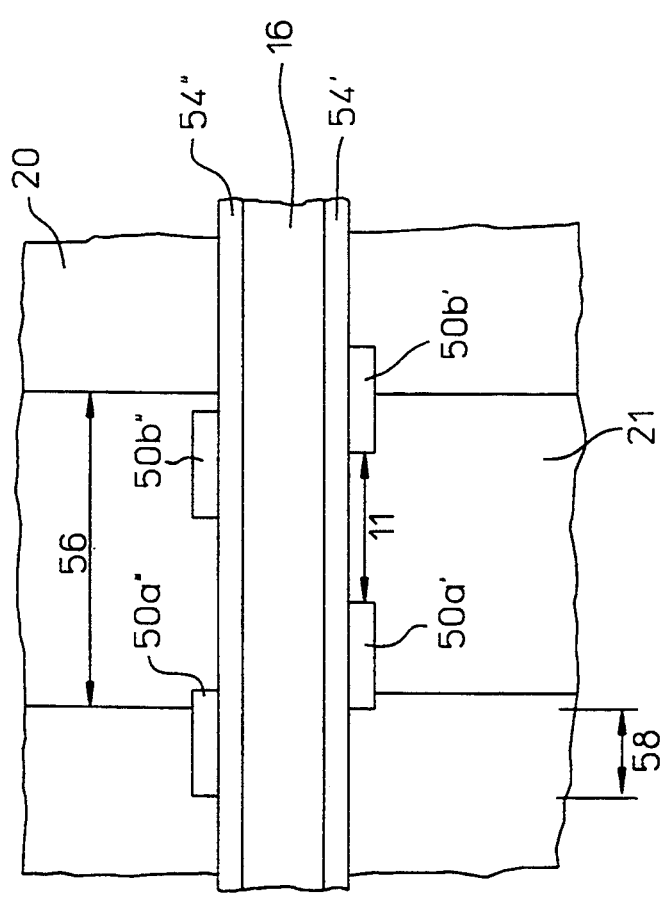
FIG. 2 illustrates the top view of another preferred embodiment of the present invention with two MR elements reading substantially the same cross-track portion of the track.

FIG. 2 illustrates the top view of another preferred embodiment of the present invention with two MR elements, 54' and 54", offset from each other to read different cross-track portions of the track 21. In FIG. 2, 50a", 50b", 50a' and 50b' designate the signal leads.

In one embodiment, it has been found that if the 2 MR elements 54' and 54" are slightly offset, such as by about 10% of the track width, the position signal from a position decoding mechanism 40 is more linear, which is a preferred condition. In another preferred embodiment, the two MR elements are considered measuring substantially the same cross-track position of the track if the two MR elements are offset from each other by less than ±20% of the width of the track. In other words, if the width 58 over the width 11 is about less than 0.2 of the width 56, the two MR elements are considered measuring substantially the same cross-track position.

In one embodiment, the width of the track is about 5 microns, having about 1 micron of guard band on one side of the track. A piece of information is recorded on the track within an area of about 4 microns in the z-direction and 2100 angstroms along the x-direction. Within that area, the magnetic head 12 reads substantially the same information. The two MR elements are substantially parallel and equal in dimension to each other. For each MR element, the distance 11 between its signal leads is about 4 microns, and its thickness along the x-direction is about 250 angstroms. The thickness along the x-direction of the insulative layer 16 is about 700 angstroms.

In operating the magnetic head 12, bias currents, for example on the order of plus or minus five milliamperes, from a current mechanism 17 with current sources 17' and 17" flow into the MR elements 14. The current sources 17' and 17" remain DC-isolated from the position decoding mechanism 40 by suitable capacitance elements 18.

Figure 3:
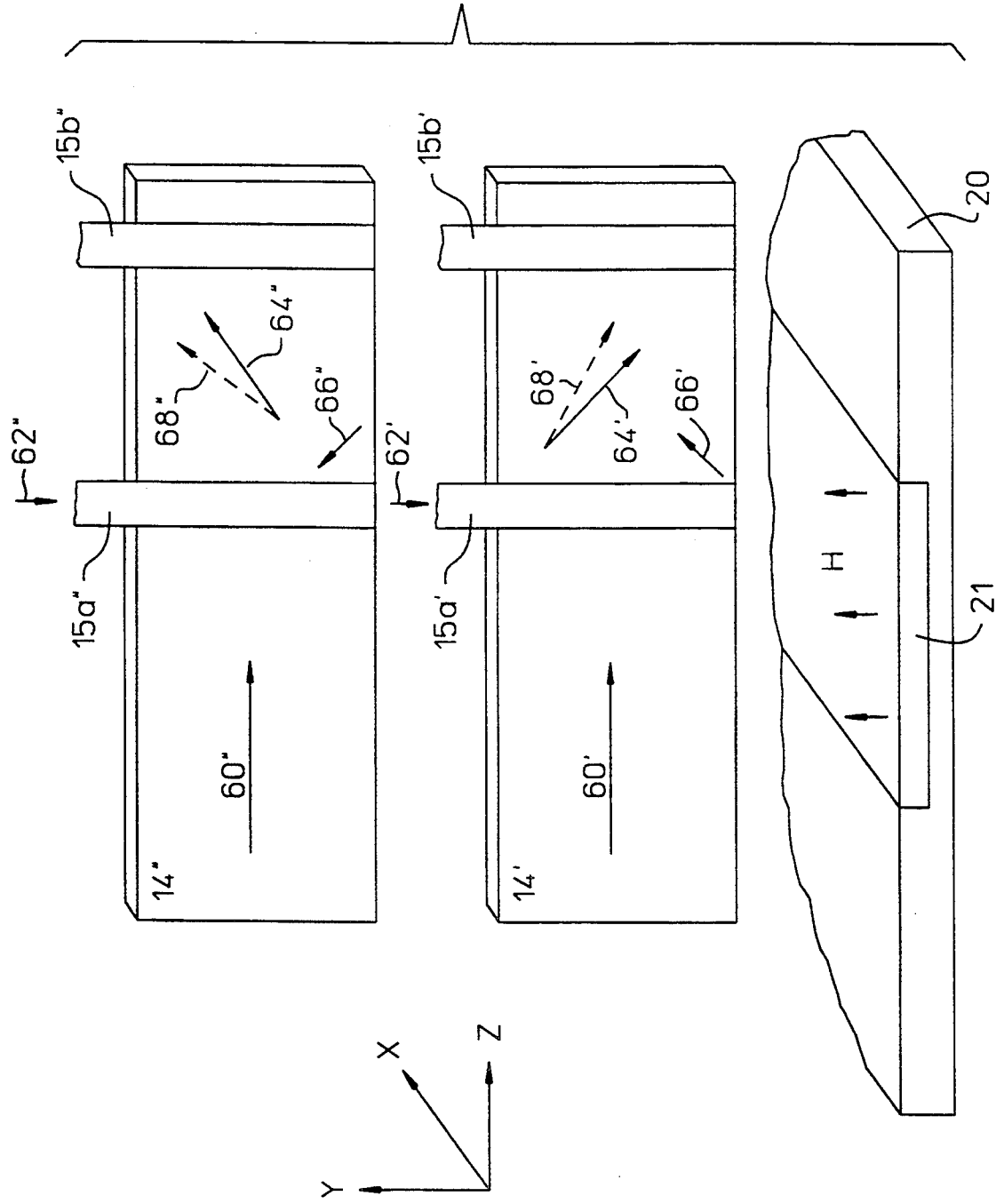
FIG. 3 illustrates two MR elements with their magnetization directions in the present invention.

FIG. 3 describes the operation of the bias currents on the MR elements 14. In one embodiment, the inherent direction of the magnetization of each MR element is constructed to point along the z-direction, or as an example, the direction 60' for the MR element 14', and the direction 60" for the MR element 14". As the bias currents flow through the MR elements, they rotate the magnetization towards different directions. For example, as the bias current 62' flows through the MR element 14' from the lead 15a' to 15b', the bias current generates a magnetic field that points along the y-direction at the MR element 14"; this generated magnetic field rotates the direction of the magnetization of the MR element 14" to 64". Similarly, the magnetization of the MR element 14' is rotated by the field created by the bias current 62" to 64'.

These directions 64' and 64" are further rotated to the directions 68' and 68" by the magnetic field from the track 21. As the MR head 14 moves across the track along the z-direction, the strength of the flux coupled to the MR head changes. As the strength of the flux changes, the output signal as detected by the leads 15' and 15" also changes. It is believed that this change would be symmetric about the track center if not for another effect which forms one of principles of the present invention.

A well known fact in magnetic theory is that the flux through a magnetic material flows perpendicular to the direction of the magnetization of the material. Due to this fact, the flux from the track flows in a direction along 66' in the MR element 14', and in the direction 66" in the MR element 14". Because these directions are at an angle relative to the longitudinal axis of the MR element axis, the flux flows along the z as well as the y axis. As the MR element 14" moves off the track along the crosstrack direction as in FIG. 3, a significant portion of the flux in the MR element 14" will be under the lead 15a". Since the signal lead 15a" has a conductivity that is much higher than that of the MR element 14", this flux does not contribute to the output signal. Similarly, at these same positions, the flux in the element 14' is carried into the active area between the leads 15a' and 15b', and does contribute to the output signal. The resulting response across the track is distorted in opposite directions for the MR elements 14' and 14". This is believed to lead to the shapes of the response as shown in FIG. 4, where the output signals, 70' and 70", from the leads 15' and 15" are shown separately as a function of the relative cross-track positions of the MR head 14. A relative position of zero implies that the head is substantially at the middle along the cross-track direction of the track 21. While not wishing to be bound by the above theory, it is believed that one of the causes of the advantageous results of the present invention is the asymmetry of the signals in the cross-track directions.

FIG. 1 shows further features of the inventive arrangement described. In particular, one embodiment of the position decoding mechanism 40 is shown including a difference amplifier 42, an adder 44, and a divider 48. The difference amplifier 42 and the adder 44 both receive signal inputs from signal leads 15a' and 15a". To individually adjust the magnitude of the signals received by the difference amplifier 42 and the adder 44, there may be amplifiers, not shown in the figure, coupled to the inputs of the difference amplifier 42 and the adder 44. The divider 48 in turn receives signal inputs from both the difference amplifier 42 and the adder 44. The difference amplifier 42 establishes a difference value between the output signals from leads 15a' and 15a", whereas the adder 44 adds together the output signals from the same output leads 15a' and 15a". The divider 48 divides the values of the outputs from the adder 44 by the outputs from the difference amplifier 42. As shown in FIG. 1, the position decoding mechanism 40 and the magnetic head 12 are electrically connected at their respective input terminals A and B with the difference amplifier 42 and the adder 44. Although not shown in the figure, there is usually an envelop detector and/or a low-pass filter coupled to the output of the divider 48 to generate the position signal.

Figure 5A:
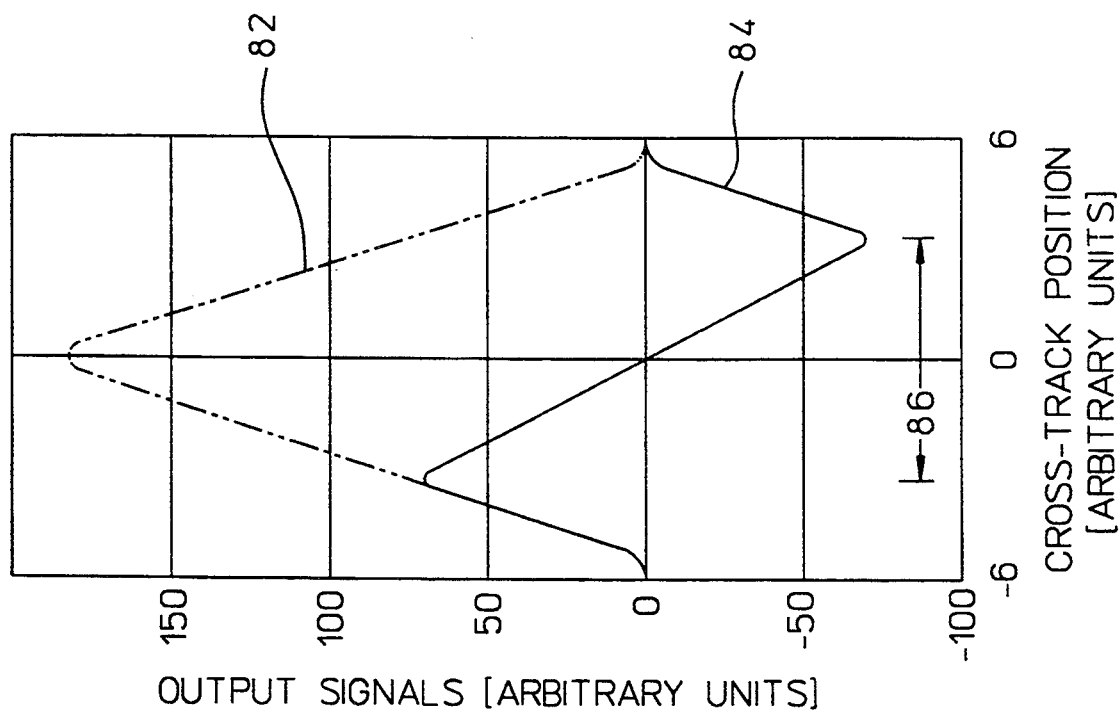

FIG. 5A illustrates the output value (A+B), 84, of the adder 44 and the output value (A−B), 82, of the difference amplifier 42. The sum and difference values are provided for combination to the divider 48, effective to produce another modified output signal in the amount of (A+B)/(A−B). The (A−B) value normalizes the (A+B) value. A linear operating region, 86, is found therebetween. In one embodiment, this linear region is about 2 microns wide. The (A+B) signal in its linear region provides a significant indicator of the cross-track position of the magnetic head 12. It is within the scope of the invention that this indicator is used to generate the position signal for controlling the position of the magnetic head 12. FIG. 5B illustrates the modified output signal (A+B)/(A−B); in another embodiment, the linear portion of this modified output signal serves effectively as the position signal for controlling the position of the magnetic head 12. The linearity of the position signal reduces the amount of computation required for a position controller to position the magnetic head 12. Such a controller should be obvious to those with ordinary skill in the art and will not be further described.

Although the present specification describes a magnetic head with only two MR elements, it should be obvious to those with ordinary skill in the art to extend the invention to more than two elements. Also, the specification describes the signal leads on surfaces of the MR elements 14' and 14" not adjacent to the insulting layer 16. It should also be obvious to those with ordinary skill in the art that the invention should also be applicable to have the signal leads, such as 15a" and 15b", on the surface of the MR element, such as 14", adjacent to the insulating layer 16.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. An apparatus for providing a position signal that indicates the cross-track position of a magnetic head relative to a selected magnetic track, the apparatus comprising:
   a first magneto-resistive (MR) element in the magnetic head to sense a portion of the recorded information in the magnetic track, the element having a longitudinal direction;

a second MR element in the magnetic head, insulated from the first MR element, to sense substantially the same cross-track portion of the magnetic track, the second element having a longitudinal direction;

current means for applying a biasing current for and producing an output signal from each MR element, the two biasing currents rotating the magnetization of the MR elements in opposing directions that are transverse from the respective longitudinal directions of the MR elements; and position decoding means manipulating the output signals to establish the position signal.

2. An apparatus as recited in claim 1 further comprising an electrically insulating layer such that the first and second MR elements are fabricated on opposite sides of the electrically insulative layer.

3. An apparatus as recited in claim 2 wherein the first and the second MR elements are substantially parallel and substantially equal in dimensions to each other.

4. An apparatus as recited in claim 1, wherein each biasing current flows along the longitudinal direction of its corresponding MR element, and the two biasing currents are in the same direction.

5. An apparatus as recited in claim 1, wherein the position signal is related to the quotient of the sum and the difference of the output signals.

6. An apparatus as recited in claim 1, wherein the position signal is related to the sum of the output signals.

7. An apparatus as recited in claim 1 wherein:
the output signals are indicative of the change in resistance of their respective MR elements; and
the position decoding means, based on the output signals, computes the position signal.

8. An apparatus as recited in claim 5 wherein the position decoding means comprises means for generating the quotient from the sum and the difference of the output signals.

9. A method of providing a position signal that indicates the cross-track position of a magnetic head relative to a selected magnetic track, the method comprising the steps of:

fabricating the magnetic head with a first magnetoresistive (MR) element and a second MR element insulated from the first MR element, each element having a longitudinal direction, both elements sensing substantially the same cross-track portion of the magnetic track;

applying a biasing current to each MR element for rotating the magnetization of the MR elements in opposing directions that are transverse from the respective longitudinal directions of the MR elements;

producing an output signal from each of said first and second MR elements; and manipulating the output signals to establish the position signal.

10. A method as recited in claim 9 wherein the step of fabricating further comprises the step of fabricating an electrically insulating layer such that the first and second MR elements are fabricated on opposite sides of the electrically insulative layer.

11. A method as recited in claim 9 wherein the first and the second MR elements are substantially parallel and substantially equal in dimensions to each other.

12. A method as recited in claim 9, wherein each biasing current is along the longitudinal direction of its corresponding MR element, and the two biasing currents are in the same direction.

13. A method as recited in claim 9, wherein the step of manipulating further comprises the step of forming the quotient from the sum and the difference of the output signals to form the position signal.

14. A method as recited in claim 9, wherein the step of manipulating further comprises the step of forming the sum of the output signals to form the position signal.

15. A method as recited in claim 9, wherein:
the output signals are indicative of the resistances of their respective MR elements.

* * * * *